(12) United States Patent
Nagura et al.

(10) Patent No.: US 7,127,343 B2
(45) Date of Patent: Oct. 24, 2006

(54) SLIP CONTROL DEVICE OF FOUR-WHEEL-DRIVE VEHICLE

(75) Inventors: Tatsunori Nagura, Tokyo (JP); Haruo Fujiki, Tokyo (JP); Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 341 days.

(21) Appl. No.: 10/666,960

(22) Filed: Sep. 23, 2003

(65) Prior Publication Data

US 2004/0059493 A1 Mar. 25, 2004

(30) Foreign Application Priority Data

Sep. 24, 2002 (JP) ............... 2002-278128

(51) Int. Cl.
*B60T 7/12* (2006.01)
*G05D 1/00* (2006.01)

(52) U.S. Cl. .................... 701/89; 701/69; 477/35; 475/223; 475/150; 180/248

(58) Field of Classification Search ............. 701/89, 701/69; 477/35; 475/223, 150; 180/248
See application file for complete search history.

(56) References Cited

U.S. PATENT DOCUMENTS

| | | | | |
|---|---|---|---|---|
| 4,757,870 A | * | 7/1988 | Torii et al. | 180/233 |
| 4,890,685 A | * | 1/1990 | Naito | 180/233 |
| 4,953,654 A | * | 9/1990 | Imaseki et al. | 180/197 |
| 5,010,974 A | | 4/1991 | Matsuda | 180/233 |
| 5,060,747 A | * | 10/1991 | Eto | 180/197 |
| 5,097,921 A | * | 3/1992 | Tezuka | 180/197 |
| 5,099,944 A | * | 3/1992 | Kageyama et al. | 180/249 |
| 5,195,037 A | * | 3/1993 | Tezuka | 701/81 |
| 5,289,895 A | * | 3/1994 | Takata et al. | 180/248 |
| 5,631,829 A | * | 5/1997 | Takasaki et al. | 701/69 |
| 5,636,121 A | * | 6/1997 | Tsuyama et al. | 701/70 |
| 5,655,986 A | * | 8/1997 | Wilson et al. | 475/204 |
| 5,701,247 A | * | 12/1997 | Sasaki | 701/1 |

(Continued)

FOREIGN PATENT DOCUMENTS

EP 0 395 009 A2 10/1990

(Continued)

*Primary Examiner*—Thomas G. Black
*Assistant Examiner*—Brian J. Broadhead
(74) *Attorney, Agent, or Firm*—McGinn IP Law Group

(57) ABSTRACT

A temporary indicated torque is obtained by taking a conventional dead zone area for a first slip control area, and the value proportional to the slip quantity for a maximum value, this temporary indicated torque is corrected by a correction value according to the tight cornering brake quantity to be the indicated torque of the transfer clutch, and occurrence of any tight cornering brake phenomenon is prevented thereby. In a slip control area after passing a dead zone area (a second slip control area), the slip control is smoothly transferred from the first slip control area to the second slip control area by performing the slip control with a value of the indicated torque according to the slip quantity added to the indicated torque in the first slip control area as the indicated torque, abrupt torque change is prevented, and the vehicle behavior is stabilized thereby.

11 Claims, 4 Drawing Sheets

U.S. PATENT DOCUMENTS

| | | | |
|---|---|---|---|
| 5,803,197 A * | 9/1998 | Hara et al. | 180/248 |
| 6,208,929 B1 * | 3/2001 | Matsuno et al. | 701/89 |
| 6,480,778 B1 * | 11/2002 | Tanaka et al. | 701/69 |
| 6,553,303 B1 * | 4/2003 | Matsuno | 701/67 |
| 6,564,139 B1 * | 5/2003 | Sakakiyama | 701/89 |
| 6,575,261 B1 * | 6/2003 | Mori et al. | 180/248 |
| 6,584,398 B1 * | 6/2003 | Erban | 701/82 |
| 2002/0002433 A1 * | 1/2002 | Matsuno | 701/67 |
| 2002/0002436 A1 * | 1/2002 | Nishida et al. | 701/72 |
| 2005/0103552 A1 * | 5/2005 | Ohno et al. | 180/248 |

FOREIGN PATENT DOCUMENTS

| | | |
|---|---|---|
| EP | 1 375 231 A2 | 1/2004 |
| JP | 07-025258 | 1/1995 |
| JP | 11-1129 | 1/1999 |

\* cited by examiner

SLIP CONTROL DEVICE OF FOUR-WHEEL-DRIVE VEHICLE

The disclosure of Japanese Patent Application No. 2002-278128 filed on Sep. 24, 2002 including the specification, drawings and abstract is incorporated herein by reference in its entirety.

BACKGROUND OF THE INVENTION

1. Field of the Invention

The present invention relates to a slip control device of a four-wheel-drive vehicle to prevent slip of wheels by varying the torque transmission distribution on the front wheel side and the rear wheel side via a transfer clutch.

2. Description of the Related Art Statement

Generally, a four-wheel-drive vehicle has an electromagnetic clutch disclosed in, for example, Japanese Unexamined Patent Application Publication No. 7-25258, or a transfer clutch using a hydraulic-driven clutch, and a system capable of varying the torque distribution on front and rear wheels by varying the coupling force of the transfer clutch is known. The system using this transfer clutch performs the slip control to prevent any slip by varying the coupling force of the transfer clutch according to the differential rotation of the wheels when the slip occurs in any one of the front and rear, right and left wheels.

However, in a conventional slip control system, a relatively large dead zone (a zone in which no control is performed) before starting the slip control is provided, and a problem occurs, in that the torque is abruptly changed if the slip control is started over the control starting slip quantity (over the dead zone), and the vehicle behavior is adversely affected.

In order to prevent the slip in this case, it is necessary to control the coupling force of the transfer clutch in the direct coupling direction according to the differential rotation of the front and rear wheels. However, in order to prevent occurrence of any tight cornering brake phenomenon during the turn at a low speed, in other words, any brake phenomenon caused by the differential rotation attributable to the difference in the turning radius between the front and rear wheels, it is necessary to set the coupling force of the transfer clutch in the uncoupling direction when any differential rotation occurs between the front and rear wheels. If the above-described dead zone is simply narrowed, the differential wheel speed caused by the differential locus of the wheels during the turn at a very low speed is mistaken for the slip, the coupling force of the transfer clutch is controlled so as to be increased, and as a result, occurrence of the tight cornering brake phenomenon is promoted.

OBJECTS AND SUMMARY OF THE INVENTION

Accordingly, an object of the present invention is to provide a slip control device of a four-wheel-drive vehicle capable of preventing any abrupt torque change caused by the transfer to the slip control while preventing occurrence of any tight cornering brake phenomenon during the turn at a low speed.

In a brief description of the slip control device of the four-wheel-drive vehicle in accordance with the present invention, when any one of the front and rear, right and left wheels is slipped, in a first area in which the wheel slip quantity is not exceeding a preset value, the indicated value to the coupling force of the transfer clutch calculated according to the slip quantity is corrected by the correction value according to the tight cornering brake quantity to perform the slip control, and when transferring to a second area in which the wheel slip quantity exceeds the preset value, the coupling force of the transfer clutch is controlled by the value of the indicated value in the first area added to the indicated value according to the slip quantity in the second area.

Other characteristics and advantages of the present invention will be clarified by the following description.

DETAILED DESCRIPTION OF THE PREFERRED EMBODIMENTS

Figure 1:
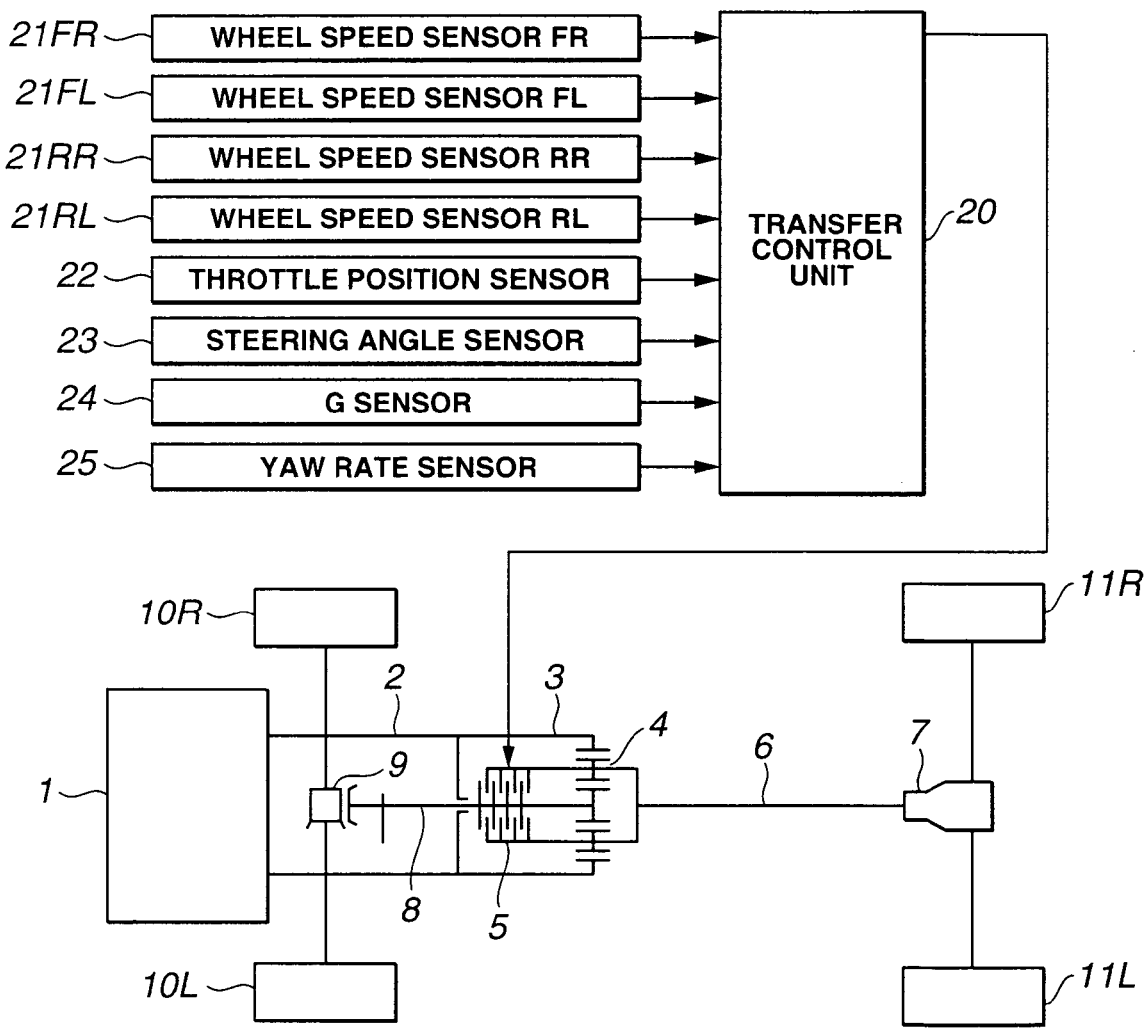
FIG. 1 is a schematic block diagram of a system.

Firstly, a power transmission system of a four-wheel-drive vehicle will be described with reference to FIG. 1. In the figure, reference numeral 1 denotes an engine, and a transmission 2 is connected to an output shaft of the engine 1. A transfer 3 is integrally provided on a rear part of the transmission 2. The transfer 3 constitutes a center differential with a planetary gear mechanism 4 to which a driving force is input from the transmission 2, and with a transfer clutch 5 comprising a multiple disc clutch which is provided to the planetary gear mechanism 4. The coupling force (the coupling torque) of the multiple disc clutch is electronically controlled by a transfer control unit 20 which will be described below, and after the output of the engine 1 is shifted to a predetermined gear by the transmission 2, the driving force is distributed to the front wheel side and the rear wheel side via the transfer 3.

In the present embodiment, the output side of the transmission 2 is connected to a ring gear of the planetary gear mechanism 4, and a carrier to rotatable support a pinion engaged with the ring gear and a sun gear is connected to a rear differential 7 via a propeller shaft 6. A carrier of the planetary gear mechanism 4 is connected to a clutch drum of the transfer clutch 5, the sun gear is connected to a clutch hub of the transfer clutch 5, and also connected to a front differential 9 via a front drive shaft 8.

The transfer clutch 5 has a drive mechanism for pressing an attachable/detachable clutch plate disposed in a row between the clutch drum and the clutch hub via the carrier, for example, an electromagnetic mechanism comprising an electromagnetic clutch and a torque amplifying cam, and the coupling torque is controlled by controlling the exciting current of the electromagnetic mechanism.

Then, the driving force input from the transmission 2 to the planetary gear mechanism 4 is transmitted to right and left rear wheels 11R and 11L from the carrier via the rear differential 7, and the differential output between the carrier and the sun gear according to the coupling force of the transfer clutch 5 is transmitted to the right and left front wheels 10R and 10L via the front differential 9. In other words, when the transfer clutch 5 is completely coupled, the carrier and the sun gear are integrally fixed to uniformly distribute the torque to the front wheel side and the rear wheel side, while the torque is disproportionately distributed to the rear wheels when the transfer clutch 5 is in a released condition.

The coupling torque of the transfer clutch 5 is electronically controlled by the transfer control unit 20 mainly comprising a microcomputer. This transfer control unit 20 receives each signal from various kinds of sensors and switches to detect the engine running condition and a vehicle traveling condition, and operates the indicated value of the coupling torque of the transfer clutch 5 based on these signals.

As shown in FIG. 1, the transfer control unit 20 receives the signals from a wheel speed sensor 21FR to detect the wheel speed of a right front wheel 10R, a wheel speed sensor 21FL to detect the wheel speed of a left front wheel 10L, a wheel speed sensor 21RR to detect the wheel speed of a right rear wheel 11R, a wheel speed sensor 21RL to detect the wheel speed of a left rear wheel 11L, a throttle position sensor 22 to detect a position of a throttle valve of the engine 1, a steering angle sensor 23 to detect the rotational angle (the steering angle) of a steering wheel, a G sensor 24 to detect the lateral acceleration of a vehicle, a yaw rate sensor 25 to detect a rotational angular velocity (the yaw rate) in the yaw direction of the vehicle, and the like.

Figure 2:
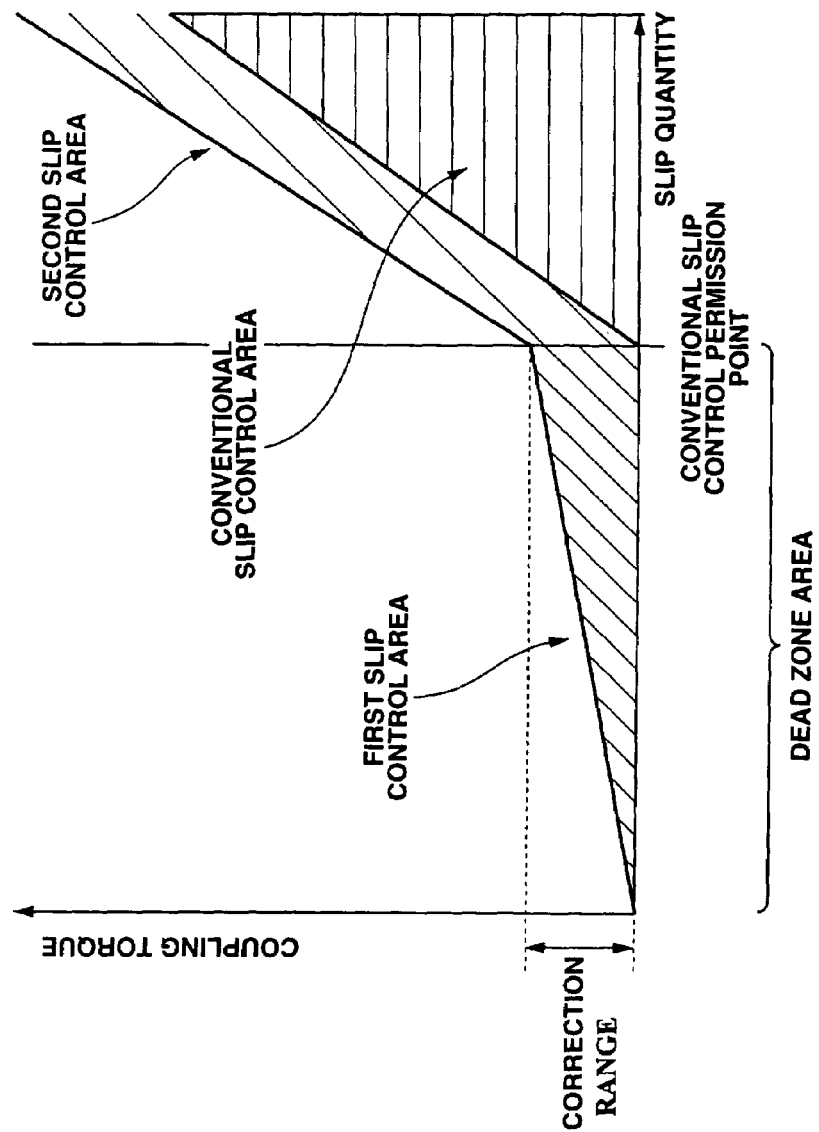
FIG. 2 is a schematic representation of a control area of the slip control.

In such a control of the coupling torque of the transfer clutch 5, if a slip occurs in any one of front and rear, and right and left wheels, the control is transferred from the normal control to the slip control. In this slip control, contrary to the conventional control to start the slip control by providing a dead zone before the differential rotation reaches a predetermined value, the dead zone area is defined as a first slip control area, the coupling torque according to the slip quantity is led in a proportional control manner, and the slip control area is smoothly transferred to a slip control area after the dead zone (the second slip control area) while preventing occurrence of tight cornering brake phenomena during a large steering wheel turn at a low vehicle speed as shown in FIG. 2.

More specifically, the temporary indicated torque is obtained with the value proportional to the differential rotation between wheels as the maximum value in the first slip control area, and occurrence of a tight cornering brake phenomenon is prevented by correcting this temporary indicated torque by the correction value according to the tight cornering brake quantity to be an indicated torque of the transfer clutch 5. In the slip control area after the dead zone (the second slip control area), by performing the slip control with the total value of the indicated torque according to the slip quantity and the indicated torque in the first slip control area as the indicated torque, smooth transfer from the first slip control area to the second slip control area can be realized, and abrupt torque change is prevented to stabilize the vehicle behavior.

Figure 3:
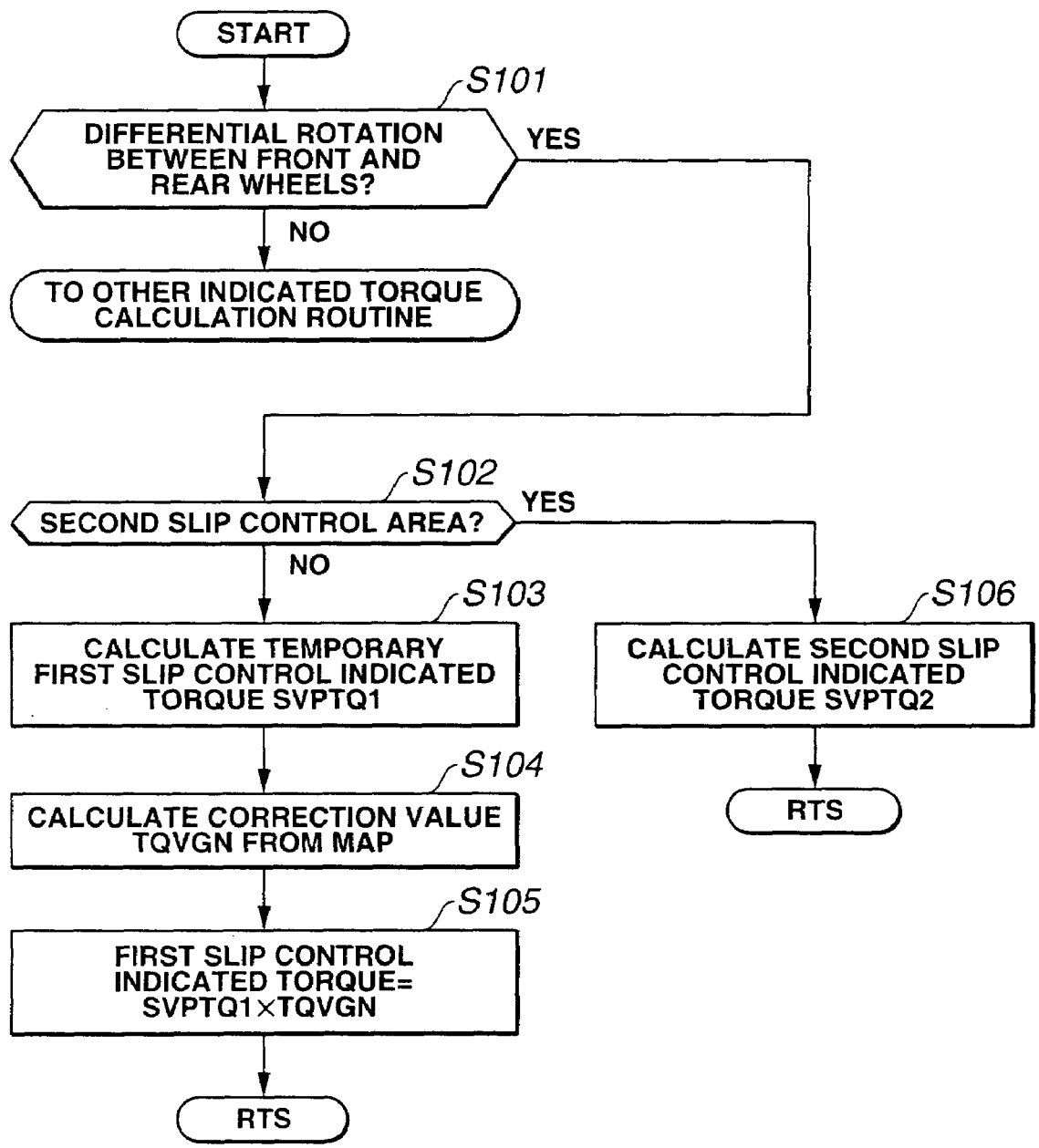
FIG. 3 is a flowchart of the slip control processing.

The slip control processing by the transfer control unit 20 will be described with reference to the flowchart shown in FIG. 3.

In this slip control processing, it is firstly examined in step S101 whether or not differential rotation between wheels above a detectable level occurs based on the signals from the wheel speed sensors 21FR, 21FL, 21RR and 21RL. As a result, if no differential rotation occurs, the process escapes from step S101, and proceeds to another indicated torque calculation routine to operate the indicated torque according to the running condition of the vehicle, and if differential rotation occurs, the process proceeds from step S101 to step S102 or subsequent steps.

In step S102, it is examined whether or not the present control area is the second slip control area. If the present control area is not the second slip control area, the process proceeds from step S102 to step S103 to set the present control to be a temporary first slip control, and the temporary indicated torque (the temporary first slip control indicated torque) SVPTQ1 in this temporary first slip control is calculated as the indicated torque proportional to the differential rotation.

Next, the process proceeds to step S104, and the correction value TQVGN in order to correct the temporary first slip control indicated torque SVPTQ1 according to the tight cornering brake quantity is calculated with reference to a map (or a table). The correction value TQVGN has a value between 0.00 and 1.00, and used as a multiplication term to the temporary first slip control indicated torque SVPTQ1. In other words, occurrence of the tight cornering brake phenomenon is prevented by correcting the coupling torque of the transfer clutch 5 so as to be reduced and increasing torque distribution on the rear wheel side the more, as the correction value TQVGN is the smaller.

More specifically, the correction value TQVGN will be obtained by estimating the tight cornering brake quantity and preparing the data map (or the table) in advance by the simulation or experiments taking the vehicle speed, the lateral acceleration and the yaw rate as basic parameters as shown in (1) to (14) below, and based on the parameters with the wheel speed ratio, the throttle position, the steering angle or the like added to the above parameters, and referring to the data map (or the table) with interpolation.

(1) Calculate the correction value based on the vehicle speed and the right-to-left wheel speed ratio.

Figure 4:
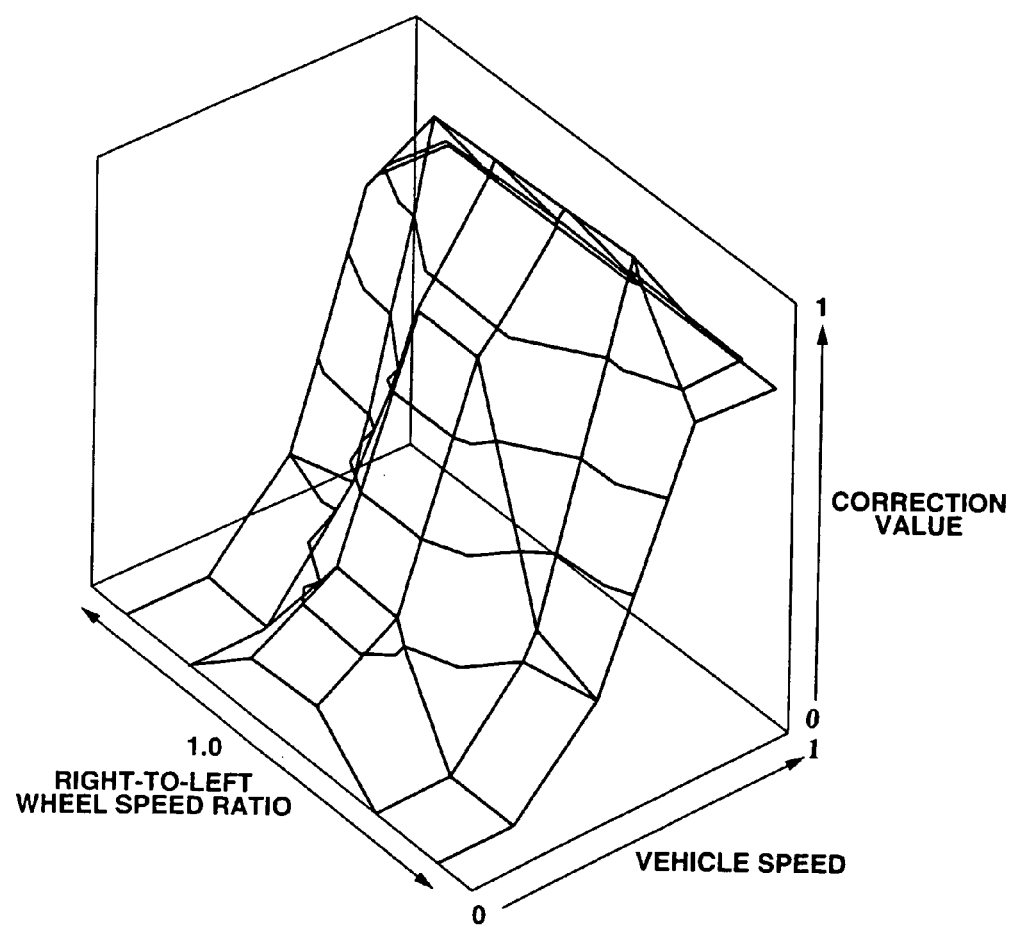
FIG. 4 is a schematic representation of an example of a correction value map.

FIG. 4 shows an example of a correction value data map with the vehicle speed and the right-to-left wheel speed ratio as parameters, and the correction value TQVGN is calculated by performing four-point interpolation of lattice points. In this map, the higher the vehicle speed is, the closer the correction value TQVGN is brought to 1.00, and the smaller the correction value to the temporary first slip control indicated torque SVTPQ1 is. Contrary to this, in a low vehicle speed area, the characteristic is set so that the farther the right-to-left wheel speed ratio is from a center value (1.0; for straight running), the smaller the correction value TQVGN is, and the more the correction value to the temporary first slip control indicated torque SVTPQ1 is. Further, the map is set so that the correction value is smaller as countermeasures for the fuel consumption when the vehicle speed is much higher than the high vehicle speed.

(2) Calculate the correction value based on the vehicle speed and the front-to-rear wheel speed ratio.

Substantially similar to (1) above, the lower the vehicle speed is and the larger the front-to-rear wheel speed ratio is, the smaller the correction value TQVGN is set, and the degree of correction to the temporary first slip control indicated torque SVTPQ1 is intensified, and the coupling torque of the transfer clutch 5 is corrected to be smaller.

(3) Calculate the correction value based on the wheel speed ratio and the vehicle speed by employing the value of the right-to-left front wheel speed ratio (the inner wheel/the outer wheel) and the right-to-left rear wheel speed ratio (the inner wheel/the outer wheel), whichever is the smaller (whichever is the larger in the case of the outer wheel/the inner wheel) as the wheel speed ratio.

In comparison with the cases of (1) and (2), correcter control is possible to the slip during the curve traveling with the inner/outer wheel difference occurring therein, and the lower the vehicle speed is and the larger the wheel speed ratio is, the smaller the correction value TQVGN is set, the degree of correction to the temporary first slip control indicated torque SVTPQ1 is intensified, and the coupling torque of the transfer clutch 5 is corrected to be smaller.

(4) Calculate the correction value based on the vehicle speed and the throttle position.

The lower the vehicle speed is and the larger the throttle position is, the smaller the correction value TQVGN is set, the degree of correction to the temporary first slip control indicated torque SVTPQ1 is intensified, and the coupling torque to the transfer clutch 5 is corrected to be smaller.

(5) Calculate the correction value based on the vehicle speed and the steering angle.

The smaller the vehicle speed is and the larger the steering angle is, the smaller the correction value TQVGN is set, the degree of correction to the temporary first slip control indicated torque SVTPQ1 is intensified, and the coupling torque of the transfer clutch 5 is corrected to be smaller.

(6) Calculate the correction value based on only the vehicle speed.

The smaller the vehicle speed is, the smaller the correction value TQVGN is set, the degree of correction to the temporary first slip control indicated torque SVTPQ1 is intensified, and the coupling torque of the transfer clutch 5 is corrected to be smaller.

(7) Calculate the correction value based on the lateral acceleration and the front-to-rear wheel speed ratio.

The larger the lateral acceleration is and the smaller the front-to-rear wheel speed ratio is, the smaller the correction value TQVGN is set, the degree of correction to the temporary first slip control indicated torque SVTPQ1 is intensified, and the coupling torque of the transfer clutch 5 is corrected to be smaller.

(8) Calculate the correction value based on the lateral acceleration and the right-to-left wheel speed ratio.

The larger the lateral acceleration is and the smaller the right-to-left wheel speed ratio is, the smaller the correction value TQVGN is set, the degree of correction to the temporary first slip control indicated torque SVTPQ1 is intensified, and the coupling torque of the transfer clutch 5 is corrected to be smaller.

(9) Calculate the correction value based on the wheel speed ratio and the lateral acceleration by employing the right-to-left front wheel speed ratio (the inner wheel/the outer wheel) and the right-to-left rear wheel speed ratio (the inner wheel/the outer wheel), whichever is the smaller (however, whichever is the larger in the case of the outer wheel/the inner wheel) as the wheel speed ratio.

In comparison with (7) and (8) above, correcter control is possible for the slip when the vehicle is running on a curve with the inner/outer wheel difference occurring therein, and the larger the lateral acceleration is and the smaller the wheel speed ratio is, the smaller the correction value TQVGN is set, the degree of correction to the temporary first slip control indicated torque SVTPQ1 is intensified, and the coupling torque of the transfer clutch 5 is corrected to be smaller.

(10) Calculate the correction value based on the lateral acceleration and the steering angle.

The larger the lateral acceleration is and the larger the steering angle is, the smaller the correction value TQVGN is set, the degree of correction to the temporary first slip control indicated torque SVTPQ1 is intensified, and the coupling torque of the transfer clutch 5 is corrected to be smaller.

(11) Calculate the correction value based on the yaw rate and the front-to-rear wheel speed ratio.

The larger the yaw rate is and the smaller the front-to-rear wheel speed ratio is, the smaller the correction value TQVGN is set, the degree of correction to the temporary first slip control indicated torque SVTPQ1 is intensified, and the coupling torque of the transfer clutch 5 is corrected to be smaller.

(12) Calculate the correction value based on the yaw rate and the right-to-left wheel speed ratio.

The larger the yaw rate is and the smaller the right-to-left wheel speed ratio is, the smaller the correction value TQVGN is set, the degree of correction of the temporary first slip control indicated torque SVTPQ1 is intensified, and the coupling torque of the transfer clutch 5 is corrected to be smaller.

(13) Calculate the correction value based on the wheel speed ratio and the yaw rate by employing the right-to-left front wheel speed ratio (the inner wheel/the outer wheel) and the right-to-left rear wheel speed ratio (the inner wheel/the outer wheel), whichever is the smaller (however, whichever is the larger in the case of the outer wheel/the inner wheel) as the wheel speed ratio.

In comparison with (11) and (12) above, corrector control is possible to the slip when the vehicle is running on a curve with the inner/outer wheel difference occurring therein, and the larger the yaw rate is and the smaller the wheel speed ratio is, the smaller the correction value TQVGN is set, the degree of correction to the temporary first slip control indicated torque SVTPQ1 is intensified, and the coupling torque of the transfer clutch 5 is corrected to be smaller.

(14) Calculate the correction value based on the yaw rate and the steering angle.

The larger the yaw rate is and the larger the steering angle is, the smaller the correction value TQVGN is set, the degree of correction to the temporary first slip control indicated torque SVTPQ1 is intensified, and the coupling torque of the transfer clutch 5 is corrected to be smaller.

If a sensor or the like to detect the above parameters is failed, the correction value TQVGN is set to be constant. However, the control in the first slip control area is preferably stopped with TQVGN=0.

As described above, after calculating the correction value TQVGN to the temporary first slip control indicated torque SVTPQ1, the process proceeds from step S104 to step S105, multiply the temporary first slip control indicated torque SVTPQ1 by the correction value TQVGN to calculate the first slip control indicated torque, and exits the routine.

This first slip control indicated torque is calculated for the front and rear wheel slip, the right and left front wheel slip, and right and left rear wheel slip, and the maximum value thereof is used for the indicated coupling torque of the transfer clutch 5, the temporary first slip control indicated torque SVTPQ1 which is obtained in a proportional control manner according to the slip quantity in the dead zone area is corrected by the correction value TQVGN, and occurrence of any tight cornering brake phenomenon during the turn at a low speed can be prevented.

Then, the control is transferred from the first slip control area to the second slip control area, and the process proceeds from step S102 to step S106. The indicated torque (the second slip control indicated torque) SVPTQ2 in the second slip control area is calculated as a value of the indicated torque in the first slip control area added to the indicated torque according to the slip quantity, and the process exits the routine.

In the second slip control area, the slip is suppressed by the differential control by adding the indicated torque portion (the temporary first slip control indicated torque SVTPQ1 or the corrected first slip control indicated torque SVTPQ1×TQVGN) in the first slip control area to the target value while the indicated torque obtained by the simulation or experiments or the like in advance according to the differential rotation.

As described above, in the present embodiment, the slip control is performed in a proportional control manner according to the slip quantity in the dead zone area in a conventional slip control in advance, and smoothly transferred to the slip control after passing the dead zone. As a result, different from a conventional system, the torque is not changed abruptly from the dead zone area, and instability of the vehicle behavior accompanied by the transfer to the slip control can be prevented. In addition, in the slip control in the dead zone area, correction is performed according to the tight cornering brake quantity, and degradation of the ride quality caused by occurrence of tight cornering brake phenomena during the turn at a low speed can be prevented.

In the present invention, it is to be clearly understood that various modifications may be constituted in the broadest interpretation within the spirit and scope of the invention.

The present invention is not limited by specified embodiments thereof unless limited by the appended claims.

What is claimed is:

1. A slip control device of a four-wheel-drive vehicle to prevent any slip of wheels by varying the torque transmission distribution to a front wheel side and a rear wheel side via a transfer clutch, and controlling the coupling force of said transfer clutch when the wheels slip, said device comprising:
    means for calculating an indicated value to the coupling force of said transfer clutch in a first area in which a wheel slip quantity is not exceeding a preset value;
    means for correcting the indicated value to the coupling force of said transfer clutch in said first area by a correction value according to a tight cornering brake quantity; and
    means for calculating the indicated value to the coupling force of said transfer clutch when transferring to a second area in which the wheel slip quantity exceeds the preset value from said first area as a value of the indicated value in said first area added to the indicated value according to the slip quantity in said second area.

2. The slip control device of a four-wheel-drive vehicle according to claim 1, wherein said correction value is calculated based on the vehicle speed.

3. The slip control device of a four-wheel-drive vehicle according to claim 1, wherein said correction value is calculated based on the vehicle speed and the wheel speed ratio.

4. The slip control device of a four-wheel-drive vehicle according to claim 1, wherein said correction value is calculated based on the vehicle speed and the throttle position of an engine.

5. The slip control device of a four-wheel-drive vehicle according to claim 1, wherein said correction value is calculated based on the vehicle speed and the steering angle.

6. The slip control device of a four-wheel-drive vehicle according to claim 1, wherein said correction value is calculated based on the lateral acceleration and the wheel speed ratio.

7. The slip control device of a four-wheel-drive vehicle according to claim 1, wherein said correction value is calculated based on the lateral acceleration and the steering angle.

8. The slip control device of a four-wheel-drive vehicle according to claim 1, wherein said correction value is calculated based on the yaw rate and the wheel speed ratio.

9. The slip control device of a four-wheel-drive vehicle according to claim 1, wherein said correction value is calculated based on the yaw rate and the steering angle.

10. A method of controlling slip in a vehicle, comprising:
    calculating a transfer clutch value in a first area in which a wheel slip quantity is not exceeding a preset value;
    correcting the transfer clutch value in said first area by a correction value; and
    calculating the transfer clutch value when transferring to a second area in which the wheel slip quantity exceeds the preset value from said first area as a value of the transfer clutch value in said first area added to a transfer clutch value according to the slip quantity in said second area.

11. A slip control device, comprising:
    means for calculating a transfer clutch value in a first area in which a wheel slip quantity is not exceeding a preset value;
    means for correcting the transfer clutch value in said first area by a correction value; and
    means for calculating the transfer clutch value when transferring to a second area in which the wheel slip quantity exceeds the preset value from said first area as a value of the transfer clutch value in said first area added to a transfer clutch value according to the slip quantity in said second area.

* * * * *